United States Patent [19]

DeBortoli

[11] Patent Number: 4,462,153

[45] Date of Patent: Jul. 31, 1984

[54] TERMINATING TOOL FOR CROSS-CONNECT CONNECTORS FOR TELEPHONE LINES

[75] Inventor: George DeBortoli, Ottawa, Canada

[73] Assignee: Northern Telecom Limited, Montreal, Canada

[21] Appl. No.: 298,485

[22] Filed: Sep. 1, 1981

[51] Int. Cl.³ .............................................. B23P 19/00

[52] U.S. Cl. ........................................ 29/760; 29/751; 269/100; 269/209; 269/238; 269/254 CS; 269/903

[58] Field of Search ........... 269/903, 70, 238, 254 CS, 269/215, 100, 99, 208; 29/760, 751, 750, 749, 861; D15/66

[56] References Cited

U.S. PATENT DOCUMENTS

| | | | |
|---|---|---|---|
| D. 244,755 | 6/1977 | Bard | D15/66 |
| 1,529,867 | 3/1925 | Burns | 269/215 |
| 2,495,438 | 1/1950 | Bentley et al. | 269/70 |
| 3,885,287 | 5/1975 | Long et al. | 29/749 X |
| 3,972,101 | 8/1976 | Casey et al. | 29/749 |
| 4,038,745 | 8/1977 | Nijman | 29/760 X |
| 4,047,294 | 9/1977 | Quigley | 29/760 X |
| 4,091,530 | 5/1978 | Nijman et al. | 29/749 |
| 4,203,196 | 5/1980 | Fukushima et al. | 29/760 X |
| 4,275,495 | 6/1981 | Boutcher, Jr. et al. | 29/749 |

*Primary Examiner*—Frederick R. Schmidt
*Assistant Examiner*—Steven P. Schad
*Attorney, Agent, or Firm*—Sidney T. Jelly

[57] ABSTRACT

A termination tool for holding cross-connect connectors, as used in telecommunications systems, while inserting conductors into the back edge of the connector, is adapted to be releasably mounted on the support member on to which the connectors are eventually mounted. The tool, of open frame form, having spaced sides, back member and a rotatable front member, has formations at the back ends of the side members which engage with the support member. A connector is inserted in a slot extending along the front member with a back edge facing forward. The conductors can be inserted, a retainer snapped over the back edge of the connector, the rotatable member rotated approximately 90° to bring the back edge of the connector and the retainer facing upwards, and then the connector and retainer removed from the tool and mounted on the support member.

9 Claims, 10 Drawing Figures

TERMINATING TOOL FOR CROSS-CONNECT CONNECTORS FOR TELEPHONE LINES

This invention relates to a termination tool for cross-connect connectors, as used in telecommunications systems, such as telephone lines. Particularly the tool holds a connector while the tool is supported on a column in a cross-connect arrangement, for connection of conductors to one side of the connector, prior to mounting of the connector on the column.

In a telecommunications system, particularly a telephone system, the conductors of two cables are interconnected. One cable is generally from a central position, for example from a central office or other central switching position. The other cable is a distribution cable, for example, the pairs of conductors connected to subscribers apparatus. Conveniently the cable from a central position can be called the in-coming cable, with in-coming conductors. The other cable is the outgoing cable, with outgoing conductors. It is necessary to interconnect incoming and outgoing conductors. Such interconnection is often done piece-meal. That is only some conductors may be interconnected at one time, additional interconnections made as desired. Also it may be desired that interconnections be changeable.

The present invention provides a tool which clips on to a mounting member of a column and holds a connector such that what would normally be the rear part, to which incoming conductors are connected, is forward facing. After connection of the incoming conductors to the terminals in the connector, a protective retainer is applied. The parts of the tool holding the connector are then rotated and the conductors tied to a strain relief member, or otherwise contained. The connector, with retainer, is then released from the tool and mounted on the support member of the column. Similarly, the outgoing connectors are connected to the rear part of a further connector which is mounted either on the same column or another column.

The tool comprises an open frame structure having two spaced apart side members connected at the rear by a back member. At the rear end of each side member is a latch member for locking the tool on the column. At the front a rotatable member is mounted between the forward ends of the side members, for rotation between the ends, with a retractable stop member for rotationally locating the rotatable member at preselected rotation positions. A latch holds a connector in the rotatable member.

The invention will be readily understood by the following description of an embodiment of the invention, by way of example, in conjunction with the accompanying drawings, in which.

Figure 1:
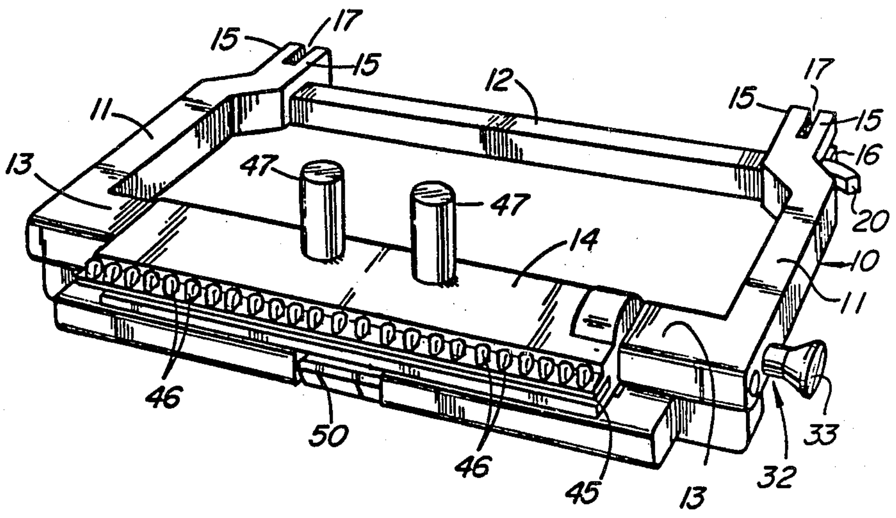
FIG. 1 is a perspective view of a tool.

As seen particularly in FIG. 1, the tool, indicated generally at 10, is of open frame structure, having two side members 11 and a rear member 12 connecting the rear ends of the side members. At the forward ends the side members have short inwardly projecting portions 13 between which is mounted a rotatable member 14.

Figure 2:
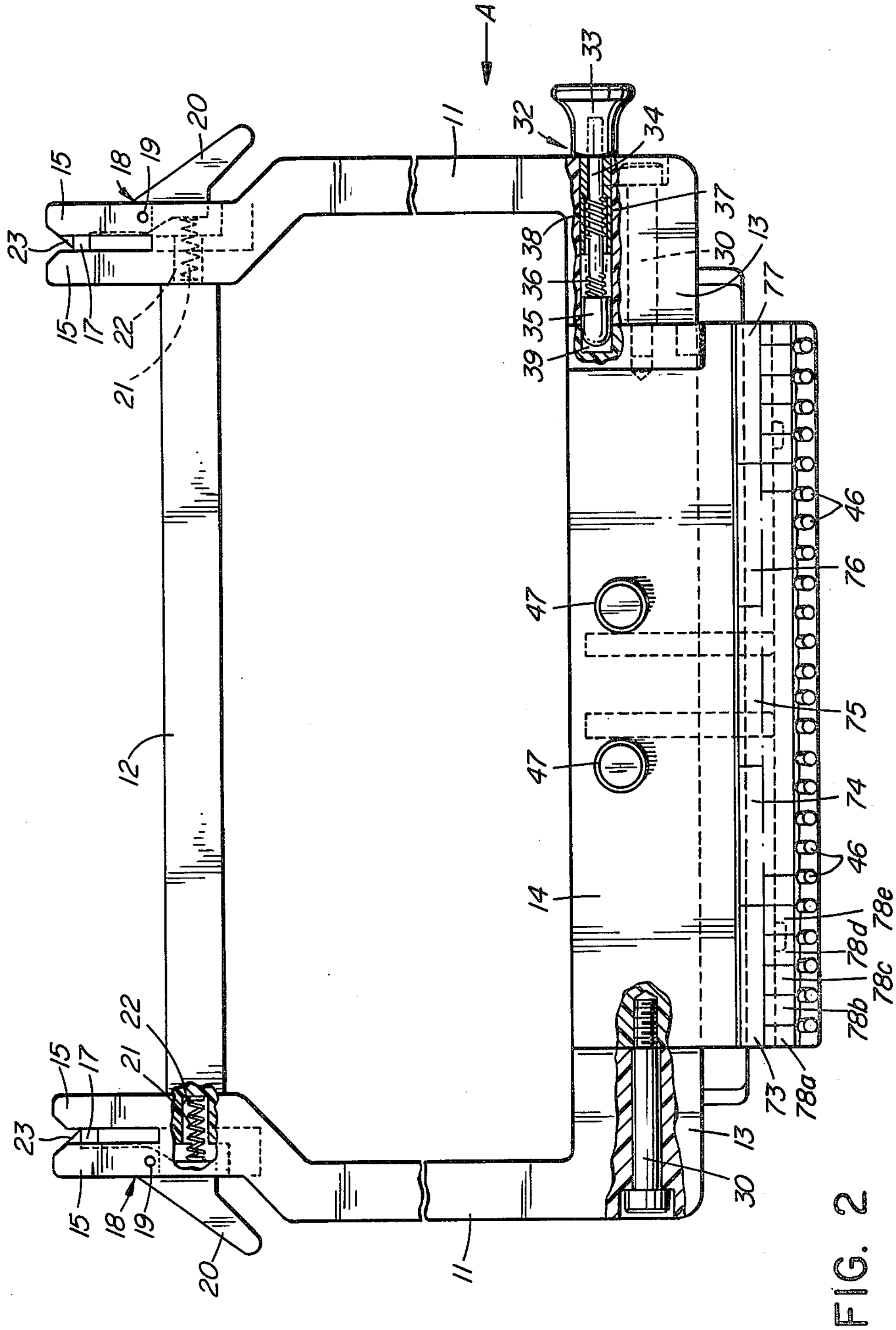
FIG. 2 is a top plan view of the tool, with various parts in section to show details of latches, pivotal support and stop member.
Figure 4:
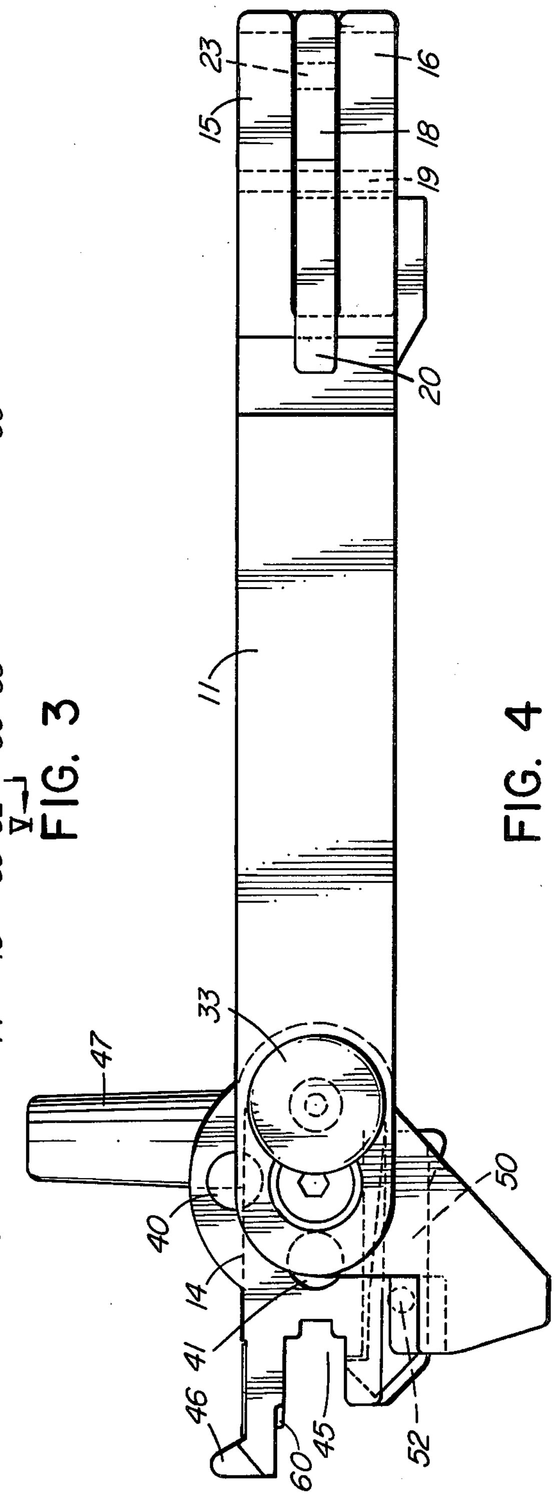
FIG. 4 is a side view of the tool, and in the direction of the arrow A in FIG. 2.

As more particularly illustrated in FIGS. 2 and 4, the rear ends of the side members 11 are extended, each having two pairs of legs 15 and 16, the legs of a pair spaced to define a slot 17, and the pairs spaced to provide room for a hinged latch 18. As seen in FIG. 2, each latch 18 is pivotted on the outer leg of each pair, at 19 and has a lever 20 extending outwards. A compression spring 21 extending from a recess 22 in the side member 11 against the latch 18 urges the lever 20 away from the side member. A protrusion 23 on the end of the latch extends into the slot 17 and, in use, engages in an aperture in a support member.

Also seen in FIG. 2 are the pivots 30 pivotally, or rotationally, supporting the member 14 between the portions 13. The pivots are screwed into the ends of the rotatable member and pivot in the ends of the side member 11. FIG. 2 further illustrates a spring loaded stop 32, mounted in the forward end of one of the side members 11, extending through a portion 13. The stop has an enlarged head 33, a stem 34 and an enlarged end 35. Around the stem 34 is a compression spring 36. A sleeve 37 in a bore 38 provides guidance for the stop member. The end 35 can enter either of two recesses in the end of the member 14, one of the recesses being shown at 39 in FIG. 2. A further recess, not shown in FIG. 2, is positioned 90° from recess 39, for clockwise rotation of the member 14, when viewed from the right hand end. The second recess is seen at 40 in FIG. 4. A further recess 41 can be provided for rotation of member 14 through 180°. This provides a safety position in that the connector receiving edge, and the protrusions 46, extend between the side members 4, inwards, facing towards the rear member 12. This protects the receiving edge, and protrusions, from damage if the tool is dropped or knocked when not in use.

Figure 6:
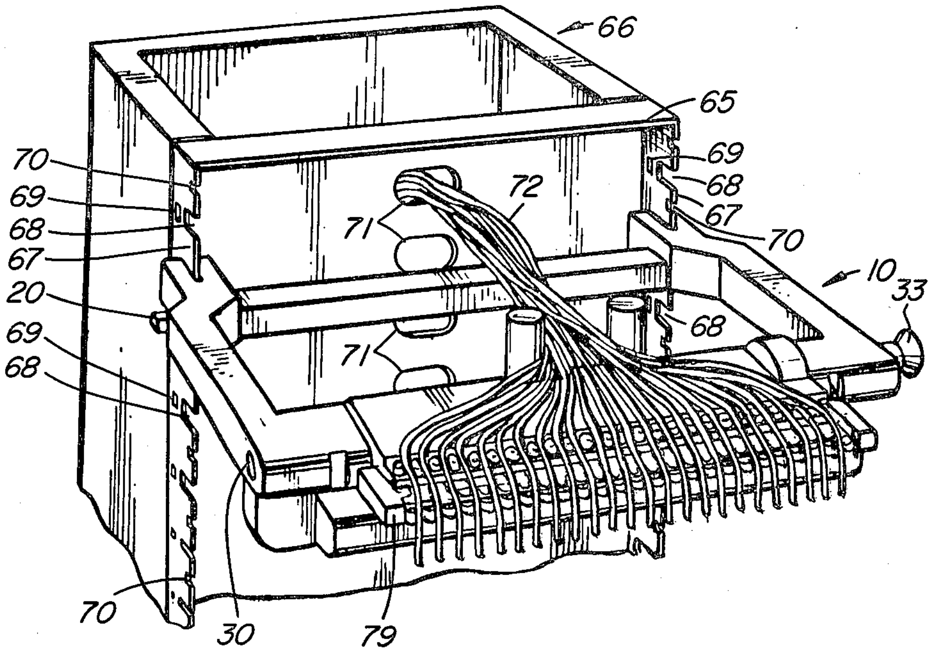
FIG. 6 is a perspective view of the tool in use on a column.
Figure 7:
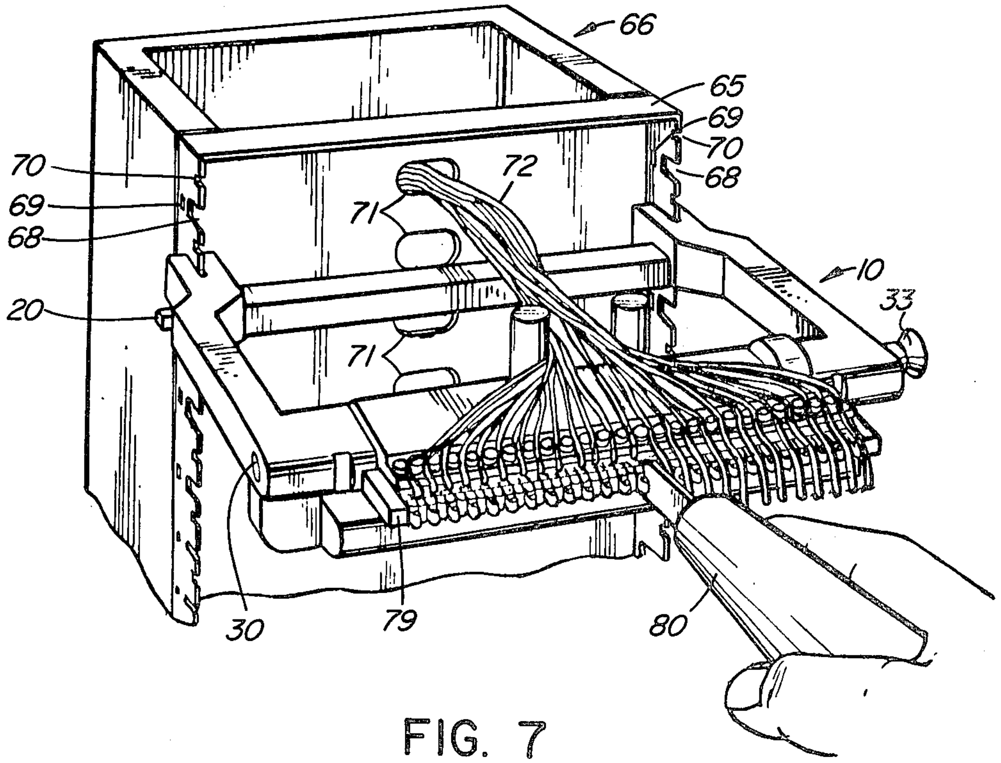
FIG. 7 illustrates conductors being connected to the rear end of terminals in a connector.
Figure 8:
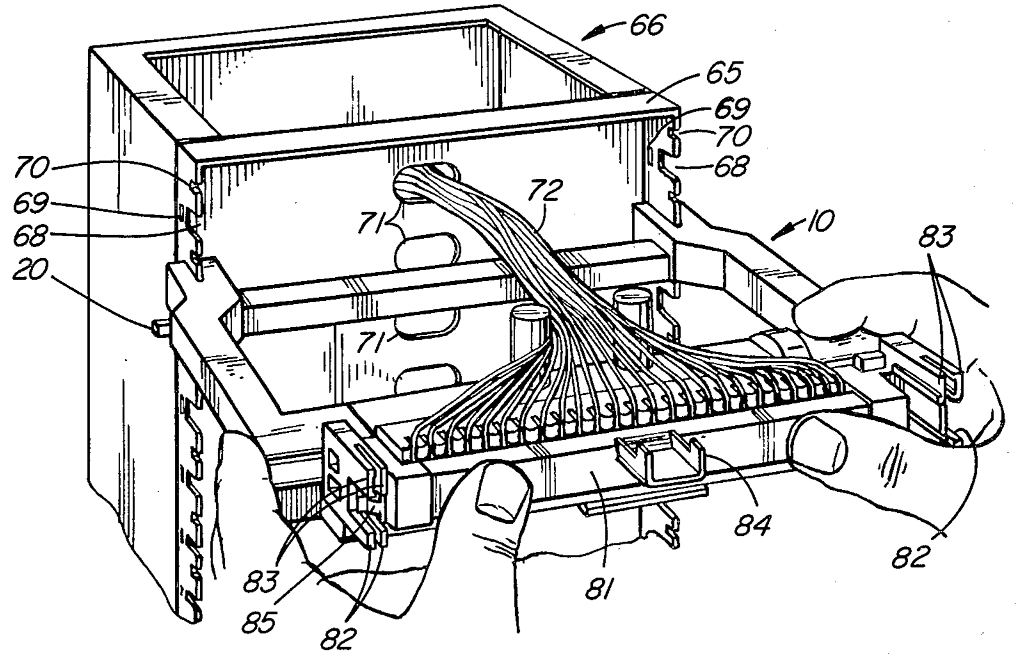
FIG. 8 illustrates application of a retainer.

Extending along the front edge of the rotatable member 14 is a slot 45. This slot is dimensioned to accept a connector. A typical connector is one as described in U.S. application Ser. No. 963,935, filed Nov. 27, 1978, in the name of the present assignees. Along the front edge of the top of the member 14 are a plurality of protrusions 46 and positioned further back are two relatively large bosses 47. A connector, for example a connector as described in the above referenced application, is generally of sandwich formation having two rows of terminals one row above the other. The terminals of one row are offset one half of a pitch relative to the other. Generally in a telephone system, a pair of conductors, are designated Tip and the other Ring, are connected to two immediately adjacent terminals. Thus one row of terminals would normaly be for Tip conductors and one row for Ring conductors. This is seen in FIGS. 6 and 7.

Figure 5:
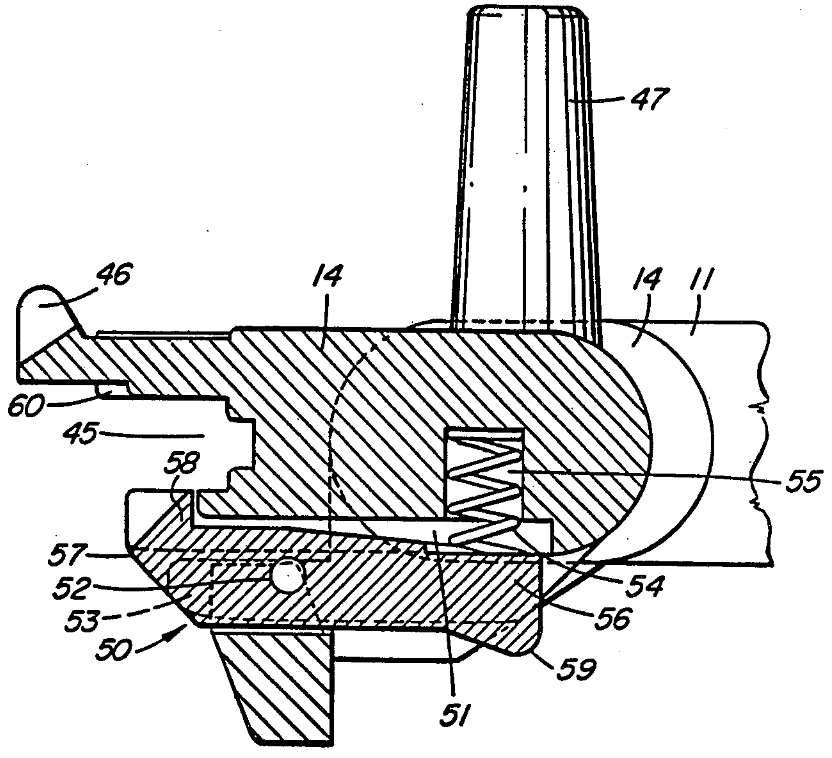
FIG. 5 is a cross-section on the line 5—5 of FIG. 3.
Figure 3:
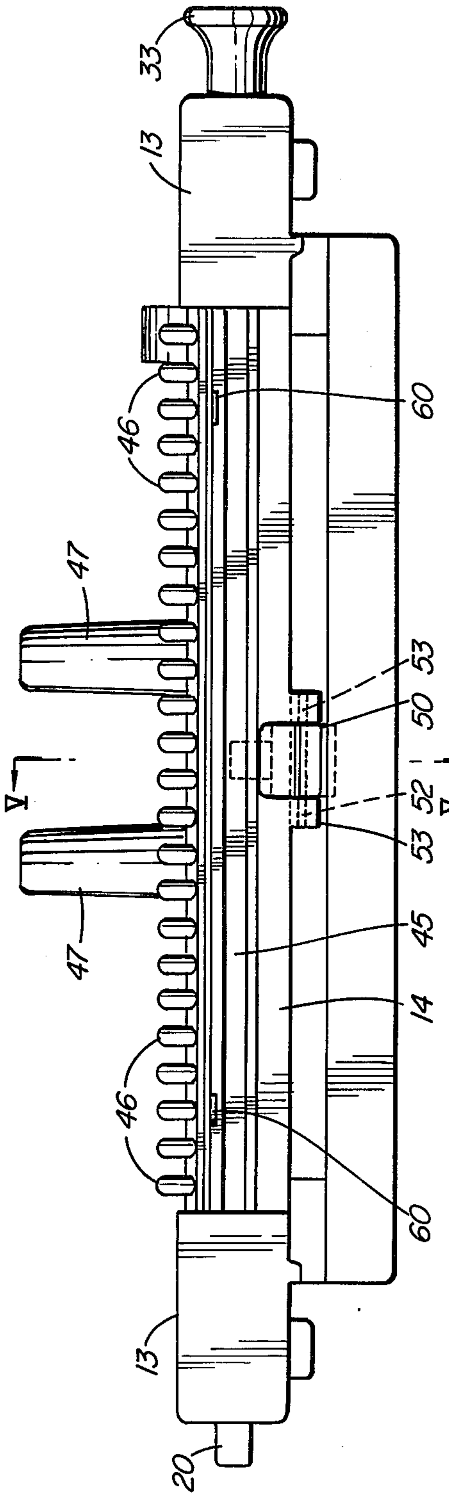
FIG. 3 is a front view of the tool.

A connector is held in the slot 45 by a latch 50 in the underside of the rotatable member 14. The latch 50 is seen in more detail in FIG. 5. The latch fits in a recess 51 in the bottom of the member 14, and rotates about a pivot pin 52 which extends through the latch and into two webs 53, (FIG. 3) one on each side of the recess 51. Towards the rear end of the latch, a compression spring 54 extends from a recess 55 in the member 14, pushing down on the end 56 of the latch 50. The forward end 57 of the latch has a projection 58 which clips over, or into, a part of the connector. The connector can be released by pressing up on the projection 59 on the end 56 of the latch. Two small protrusions 60 at the upper surface of the slot 45, engage in recesses in the connector to locate the connector relative to the tool.

A connector generally provides for the interconnection of a predetermined number of pairs of conductors, for example twenty-five pairs. The incoming conductors are connected to the rear ends of terminals, and are connected to the connector while it is supported in the tool, as illustrated in FIGS. 6 and 7. After removal of the connector from the tool and mounting on a column, cross-connect, or jump wires can be connected to the front ends of terminals. Similarly the outgoing conductors are connected to the rear ends of terminals, in another connector, being connected while the connector is in the tool. After removal from the tool the connector is mounted on the column. For a small number of cross-connects, a single column may be used, the connectors having the incoming conductors connected thereto being mounted, for example, at the top part of the column. The connectors having the outgoing conductors connected to them are at the lower part of the column.

For larger installations, i.e. larger cables with larger numbers of conductors, two or more columns will be provided, connectors with incoming conductors on one column, connectors with outgoing conductors on the other column. Interconnection is by running a conductor from the front of one connector to the front of another connector.

FIGS. 6 to 10 illustrate the various steps in attaching conductors to a connector, and mounting a connector on a column, and a tool. The tool 10 is mounted on a mounting member 65, which is the front member of a column, indicated generally at 66. The mounting member is hingedly attached to the main part of the column so that it can be opened and swung forward. A column, and associated enclosure, for which the tool of the present invention is particularly useful, is described in U.S. Pat. No. 4,371,751, issued Feb. 1, 1983, to the present assignees.

The mounting member is of a shallow dish shape having a back panel and forward extending side walls 67. A mounting member is intended to carry a predetermined number of connectors, for example twenty-four. As seen in the FIGS. 6 to 9, the side walls 67 have a plurality of large slots 68. The slots extend part way into each side wall and a rectangular hole 69 is formed inward of each slot 68. Adjacent to each slot 68 is a smaller slot 70. A tool is mounted on a column mounting member by sliding the legs 15 and 16 on either side of a side wall, the latches 18 passing down the slots 68. As the tool is pushed home the projections 23 hit the ends of the slots 68, deflect the latches outward and then the projections snap into the holes 69. A connector is then pushed into the slot 45. As the connector enters, the latch 50 is depressed, by the connector, until the connector is fully inserted, when the projection 58 enters a recess, or engages behind a rib or similar member on the connector. The conductors from a cable are brought up inside the column and the conductors for connection to a particular connector feed through an appropriate aperture 71 in the mounting member. The conductors, indicated at 72, are then brought forward, between bosses 47, and the individual pairs positioned between the protrusions 46.

To provide for correct positioning of the conductors, there are colour strips behind the protrusions 46. Thus in FIG. 2, at the left side, there is a white strip 73. The next strip 74 is orange, next strip 75 black, next strip 76 yellow and the final strip 77 violet. In front of each colour strip, there are five coloured sections one for each space between two protrusions 46, plus one at each end of the row. The colour sections repeat for each colour strip, in the order of blue, orange, green, brown, grey. The colour sections in front of strip 73 are indicated at 78*a, b, c, d,* and *e.* Thus the installer has a colour coding on the tool 10 which enables the installer to connect the colour coded pairs of conductors to the correct terminals. This avoids the necessity of the installer having to remember the colour coding, eliminating one possibility of errors. The conductors are pulled down over the connector, with the conductors positioned for insertion in the terminals. This is as illustrated in FIG. 6, the conductors shown extending down over the edge of a connector 79.

The terminals in the connector are of the insulation displacing type, for example as described in U.S. Pat. No. 4,002,391, issued Jan. 11, 1977, in the name of the present assignees. The individual conductors are pushed into slots in the connector and then into the terminals by an insertion tool 80. The tool 80 both inserts the conductor and cuts off any excess. This is illustrated in FIG. 7.

When the conductors are all inserted, a retainer is pushed over the connector, a typical retainer being described in co-pending application Ser. No. 294,836 filed Aug. 21, 1981 (Cross-Connect Apparatus for Cross-Connections for Telecommunications Systems, in a Non Protected Environment-RO-1657 G. DeBortoli, et al). The retainer has a sealing compound within it which envelopes the edge of the connector and the ends of the conductors. The retainer is seen at 81 in FIG. 8, and has pairs of legs 82, 83, at each end which are similar to the legs 15 and 16 of the tool. The retainer also engages with the conductors 72 and acts as a strain relief.

Figure 9:
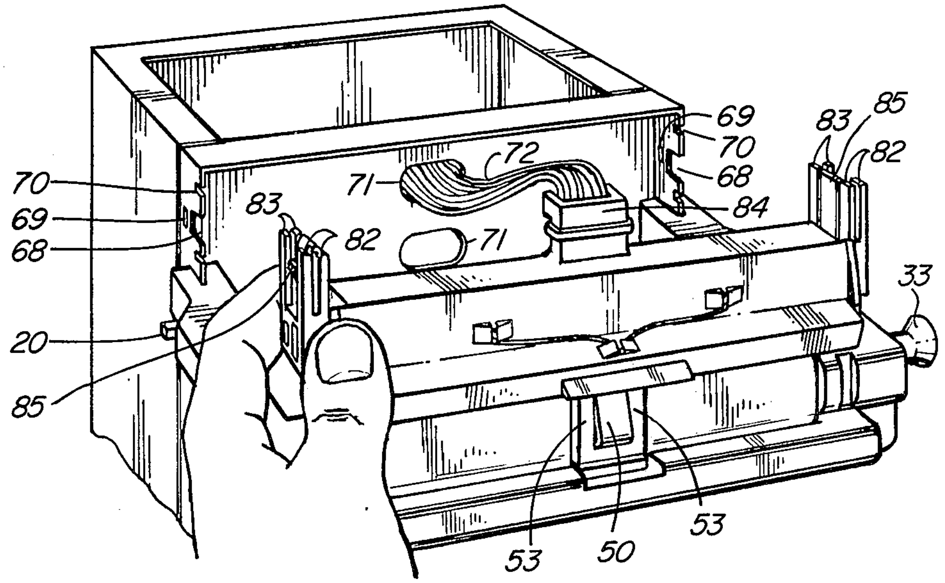
FIG. 9 illustrates rotation of the connector.
Figure 10:
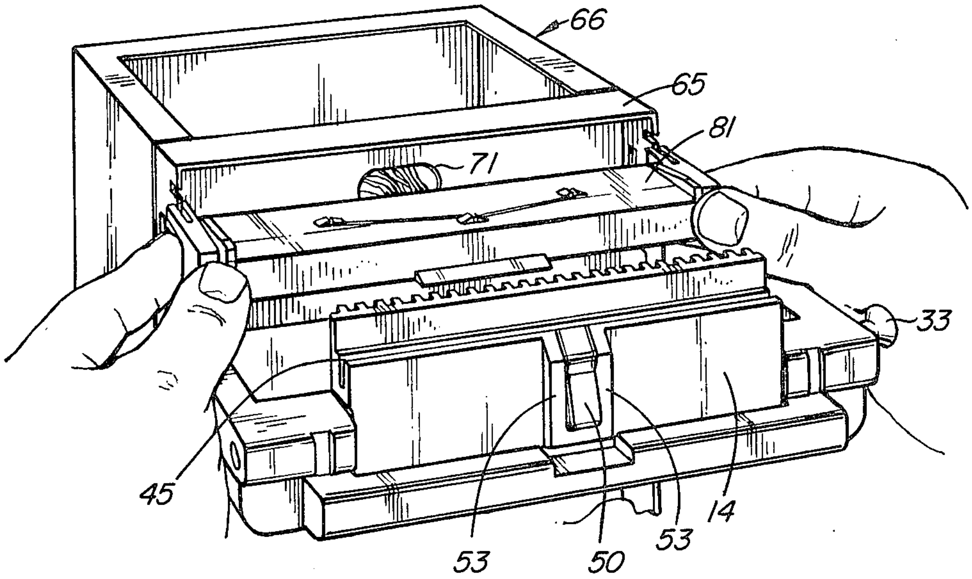
FIG. 10 illustrates the connector removed from the tool and mounted on the support member of the column.

After application of the retainer, the stop 32 is pulled out and the front or rotatable member 14 rotated through 90°, the legs 82, 83 of the retainer extending upward. The conductors 72 are collected together and tied to a central web or bracket 84 which acts as a further strain relief. This is illustrated in FIG. 9. The latch 50 is then depressed and connector and retainer removed from the tool, rotated through a further 90° and mounted on the mounting member. The retainer 81 has a flexible guide member 85 between the pairs of legs 82 and 83. The guide member 85 at each end is inserted into a slot 68 and as the retainer and connector is pushed home the guides deflect and small protrusions 86 on the ends of the guides snap into the holes 69. The latches 18 are then released and the tool removed from the mounting member for re-attachment at another position. The rotatable member is returned to the original position, as in FIG. 1, before mounting on the mounting member, or can be returned to this position before removal from the mounting member or after re-mounting.

The tool is normally used sequentially, starting at the top of a column and working down although the tool can be mounted on the column at any position, as desired. The connector is held firmly and in a very convenient position for insertion of the permanent connection conductors. The colour coding on the tool assists in correct installation of conductors. It is not necessary to work sequentially across a connector, in a particular colour code order, as conductors can be taken at random from the bundle passed through an aperture 71 and inserted at the correct position as indicated by the colour coding on the tool.

What is claimed is:

1. A terminating tool for cross-connect connectors, said tool comprising a planar rectangular frame structure including:

two spaced apart side members;

a back member extending between and connecting the rear ends of the side members;

an inwardly projecting portion at the forward end of each side member, the portions having opposed inner ends;

a rotatable member extending between said opposed inner ends, said rotatable member pivotally supported in said inwardly projecting portions for rotation about an axis within said rotational member;

a retractable stop mounted in one of said inwardly projecting portions and moveable in a direction parallel to said axis to be selectively engaged in one of a plurality of recesses in an immediately adjacent end of the rotatable member, the recesses spaced around said axis;

said rotatable member being of substantially rectangular cross section in a plane normal to said axis, a slot extending along a front edge of the rotatable member and extending inwards from said front edge for receiving and holding a connector, and a latch member pivotally mounted in a bottom surface of the rotatable member below said slot, the latch member having a forward end extending up in front of said front edge of said rotatable member into said slot, to engage with a connector positioned in said slot, to retain said connector in position, means for pivotting said latch to move said forward end of said latch member from said slot, and means biasing said latch to move the forward end into said slot;

and mounting means at the rear of each side member for releasably mounting the tool on a support member.

2. A tool as claimed in claim 1, said mounting means comprising two pairs of legs extending rearward at the rear end of each side member, the pairs of legs spaced apart, the legs of each pair spaced to define aligned slots; and a pivotal latch member extending between the pairs of legs for each side member, a protrusion on each latch member; means biasing each latch member to a position where said protrusion extends across said slots, and means for retracting said latches to move said protrusions out of alignment with said slots.

3. A tool as claimed in claim 1, said retractable stop member comprising an axially slidable member mounted in a front end of one of said spaced apart side members, and means biasing said axially slidable member inwards towards said rotatable member; recesses in an adjacent end of said rotatable member at predetermined angular positions relative to said front edge of said rotatable member, an inner end of said stop member extending into a preselected one of said recesses for a desired angular orientation of said rotatable member; and means for retracting said stop member.

4. A tool as claimed in claim 3, said stop member positioned rearward of the pivotal axis of the rotatable member, a first recess in said adjacent end of the rotatable member at a rear edge and positioned to locate said front edge of the rotatable member in a forward facing position.

5. A tool as claimed in claim 4, includng a second recess in said adjacent end of the rotatable member and spaced from said first recess to locate said front edge of the rotatable member in an upward facing position.

6. A tool as claimed in claim 5, including a third recess in said adjacent end of the rotatable member spaced from said first recess to locate said front edge in a rearward facing position and extending between said side members.

7. A tool as claimed in claim 1, including an upper surface on said rotatable member at said front edge, and a plurality of protrusions extending upward from said upper surface, said protrusions spaced apart along said front edge.

8. A tool as claimed in claim 7, including colour code strips positioned behind said protrusions.

9. A tool as claimed in claim 1, including two bosses on an upper surface of said rotatable member, said bosses positioned on either side of and adjacent to a central axis on said upper surface.

* * * * *